United States Patent
Kraus et al.

(10) Patent No.: US 11,300,952 B2
(45) Date of Patent: Apr. 12, 2022

(54) ANOMALY DETECTION IN A PNEUMATIC SYSTEM

(71) Applicant: Festo SE & Co. KG, Esslingen (DE)

(72) Inventors: Dominic Kraus, Stuttgart (DE); Thilo Streichert, Stuttgart (DE); Wolfgang Gauchel, Esslingen (DE)

(73) Assignee: Festo SE & CO. KG, Esslingen (DE)

( * ) Notice: Subject to any disclaimer, the term of this patent is extended or adjusted under 35 U.S.C. 154(b) by 23 days.

(21) Appl. No.: 16/833,455

(22) Filed: Mar. 27, 2020

(65) Prior Publication Data

US 2020/0310405 A1    Oct. 1, 2020

(30) Foreign Application Priority Data

Mar. 29, 2019  (DE) .................... 10 2019 108 268.4

(51) Int. Cl.
G05B 23/02     (2006.01)
G05B 19/418    (2006.01)
G06K 9/00      (2006.01)

(52) U.S. Cl.
CPC ..... G05B 23/0281 (2013.01); G05B 19/4183 (2013.01); G05B 23/024 (2013.01); G06K 9/00523 (2013.01); G06K 9/00536 (2013.01)

(58) Field of Classification Search
None
See application file for complete search history.

(56) References Cited

U.S. PATENT DOCUMENTS

| 6,226,760 | B1  | 5/2001 | Burkhardt et al. |
| 7,350,106 | B2* | 3/2008 | Longere .............. G06F 11/2257 702/117 |
| 2019/0072940 | A1 | 3/2019 | Schnabel et al. |

FOREIGN PATENT DOCUMENTS

| DE | 19742446 A1 | 4/1999 |
| DE | 102017215508 A1 | 3/2019 |
| KR | 20110057539 A * | 6/2011 |
| WO | WO-2020194534 A1 * | 10/2020 ........... G05B 23/024 |

OTHER PUBLICATIONS

Hu et al., "A Knowledge-Based Real-Time Diagnostic System for PLC Controlled Manufacturing Systems" IEEE 1999 (Year: 1999).*
Office Action issued in German Patent Application No. DE 10 2019 108 268.4 (to which this application claims priority), dated Dec. 19, 2019 and English language machine translation thereof.

* cited by examiner

*Primary Examiner* — John C Kuan
(74) *Attorney, Agent, or Firm* — Falk Ewers; Ewers IP Law PLLC

(57) ABSTRACT

An error detection and localisation in a pneumatic system and in particular an error detection module includes a read-in interface for reading-in digital signals from the automation plant, a first processor unit designed to execute a detection algorithm for calculating an anomaly score for the automation plant on the basis of the set of read-in signals, a second processor unit which is designed—in the event that the anomaly score calculated with the first processor unit indicates an anomaly—to perform a machine localisation method for localising the error, wherein the machine localisation method has been trained in a training phase in order to calculate and as a result provide, on the basis of a detected circuit diagram of the automation plant with respect to the calculated anomaly score, probabilities of possible causes of error in relation to individual components of the automation plant.

20 Claims, 6 Drawing Sheets

SV - Server
P1 - First Processor Unit
P2 - Second Processor Unit
P3 - Third Processor Unit
Config-UI - Configuration Interface
PLC - Programmable Logic Controller
AA - Plant
S1 - First Sensor Unit
K1 - First Component
GW - Gateway Node

ANOMALY DETECTION IN A PNEUMATIC SYSTEM

CROSS REFERENCE TO RELATED APPLICATIONS

This application claims priority to German patent application DE 10 2019 108 268.4, filed Mar. 29, 2019, the entire content of which is incorporated herein by reference.

TECHNICAL FIELD

The present disclosure relates to technical error detection and localisation in a pneumatic automation plant, e.g., in a production plant comprising actuators and sensors, and relates in particular to an error detection module, an error detection system, a method and a computer program.

BACKGROUND

Fundamentally high quality, robustness and availability requirements are placed upon components or field devices in different types of automation plants. A failure or malfunction of a field device in a process can cause extremely high costs, particularly in the event of a manufacturing stoppage caused thereby. Therefore, in field devices a high degree of technical complexity is deployed in order to considerably reduce the risk of malfunctions or in order to be able to recognise and report a defect independently. Functions are integrated into the field device repeatedly in a redundant manner, measurement results are monitored and verified internally on a permanent basis. The requirements for safeguarding against failure in relation to the field device increase with its field of application (e.g. in nuclear power plants). Therefore, during monitoring of field devices it is necessary to ensure that the devices involved function in an error-free manner and any failure is detected in the most timely manner possible and even before any disruption.

This monitoring and analysing task uses methods from the field of predictive maintenance which analyse a large amount of sensor data from the field devices. These methods are frequently based upon predictive maintenance algorithms. The quality of these algorithms correlates with the amount of available sensor data from continuously observed systems. However, if only a very small amount of sensor data is available, these approaches frequently do not produce satisfactory results.

Furthermore, machine learning and neural network approaches are known in the field of automatic decision support.

However, if plants having only minimal sensorics, e.g., a pneumatic system with only two final position sensors, are to be monitored for errors, the known approaches cannot be adopted. However, these plants are still to be monitored for errors.

SUMMARY

It is Proceeding therefrom, it is an object of the present disclosure to provide an approach, by means of which a statement relating to the defectiveness of components of an automation plant, in particular a pneumatic automation plant, can be provided. Therefore, monitoring is to be improved and the automation plant is to be made more reliable on the whole. A statement relating to the defectiveness is to be provided at least at component level.

This object is achieved by an error detection module for detecting and evaluating anomalies in automation plants, in particular in a pneumatic automation plant, comprising:
- a read-in interface, e.g. a digital OPC-UA interface, for reading-in digital signals from the automation plant; in particular only three digital signals may be available (time signals of two final position switches and point in time of valve switching command);
- a first processor unit which is designed to execute a detection algorithm for calculating an anomaly score for the automation plant on the basis of the set of read-in signals;
- a second processor unit which is designed—in the event that the anomaly score calculated with the first processor unit indicates an anomaly—to perform a machine localisation method for localising the error in order, with respect to the anomaly score, to calculate and to provide as a result probabilities of possible causes of error in relation to individual components of the automation plant. In one advantageous development, the result can even be provided in relation to sub-components of the components—and therefore in a more detailed manner.

The disclosure has the technical advantage that it is possible to localise errors directly in relation to the components of the automation plant, and also when only a small number of sensors, in particular only two final position sensors, are installed.

Therefore, error localisation is possible on the basis of only three digital signal values, namely at the points in time of the two final position switches on a cylinder and at the point in time of the valve switching signal (the valve switching signal represents the technical procedure if the controller instructs the valve with the command "SWITCH NOW" and therefore can also be defined as a valve switching command).

A further (e.g., third) processor unit can be designed for the purpose of configuring or training the machine localisation method. This further processor unit comprises: a circuit diagram-read-in interface for reading-in a circuit diagram for the automation plant; this serves the purpose of training an error localisation model, which is to be generated, typically on one occasion to read-in the digitised circuit diagram.

In an exemplary embodiment of the disclosure, the first processor unit (which can be allocated to the functionality of the detection algorithm) is implemented on a device other than the second processor unit (with the functionality of the machine localisation method for localising the error with an increased anomaly score) and is formed in particular on a control unit. Therefore, the system for error detection and localisation can be adapted very flexibly to the respective hardware and so computationally intensive processes can be transferred to high-capacity hardware (e.g., cloud servers).

In an alternative, further exemplary embodiment of the disclosure, the error detection module comprises a configuration interface as a front-end for configuring and for training the model. Therefore, e.g., the construction of the decision tree can be configured quickly and easily by the user or operator of the system.

In another exemplary embodiment of the error detection module, the same is applied for automation plants comprising a specific architecture or a typical structure. The pneumatic system comprises one to a plurality of pneumatic drives which are each connected to at least one valve, wherein a plurality of valves can be arranged on one valve cluster and/or a plurality of valve clusters can be connected to one supply unit. A plurality of drives can also be connected to one valve at the same time. The architecture is represented in the electronic circuit diagram which is read-in by the system and used for calculation purposes. In other exemplary embodiments, a different architecture can be used as a basis. This is made possible because the machine localisation method takes the respective circuit diagram into consideration and in so doing automatically recognises patterns of activities and deviations from patterns and can localise possible errors by reason of the detected circuit logic.

In a further aspect, the disclosure relates to an error detection system for detecting and evaluating anomalies in automation plants, in particular in a pneumatic system, comprising:
- an error detection module, as described above;
- a gateway (to the Internet, e.g. edge computer) and
- a cloud-based server which is connected to the error detection module via a web interface.

The first and second processor unit can be deployed (implemented and provided) as a distributed system on different units (controller, gateway and/or server). It can also be formed on the same unit.

The achievement of the object has been described above in relation to devices (error detection module, system). Features, advantages or alternative exemplary embodiments mentioned herein are also to be transferred to the other claimed subjects and vice versa. In other words, the method and the computer program can also be developed with the features which are described and/or claimed in conjunction with the module or system. In so doing, the corresponding functional features of the method are embodied by corresponding physical modules, in particular by hardware modules or microprocessor modules, of the system or of the product, and vice versa.

In a further aspect, the disclosure relates to a method for detecting and evaluating anomalies in an automation plant, in particular in a pneumatic automation plant, comprising the method steps of:
- reading-in—typically two—digital signals from the respective (pneumatic) drive and from the digital switching command for the valve of the automation plant via a read-in interface; the issuers or transmitters of the signals are also designated as "sensor";
- executing a detection algorithm for calculating an anomaly score for the automation plant on the basis of the set of read-in signals; in one advantageous development, the anomaly score is calculated not only overall for the entire automation plant but also in an itemised and dedicated manner for the individual drives thereof. Therefore, the significance can be substantially improved and provided in a more detailed fashion.

If the calculated anomaly score indicates an anomaly and exceeds in particular a pre-configurable limit value: triggering a machine localisation method for localising the error, wherein the machine localisation method has been trained in a training phase in order to calculate and provide as a result, on the basis of a detected circuit diagram of the automation plant with respect to the calculated anomaly score, probabilities of possible causes of error in relation to individual components of the automation plant or in relation to sub-components (component parts) of the components.

The circuit diagram is read-in from a file in the training phase in an advantageous manner during commissioning in order to configure data correlations and dependencies. Alternatively, the circuit diagram can also be programmed locally on the error detection module or can be manually input.

In one advantageous development of the disclosure, the machine learning method (or the second processor unit) can be designed not only to output a result with the calculated error probabilities for each component of the plant, but also to do so in a more detailed form, namely per sub-component of a respective component. Therefore, the result can be provided in a finer-granular and specific manner for component parts or elements of a component.

In an exemplary embodiment, a pattern recognition algorithm is used as a detection algorithm for calculating the anomaly score. Alternatively, the anomaly score can be calculated by accessing a memory, in which a trained detection model is stored. The model can be created by means of automatic classification methods, in particular by means of a k-means algorithm. For this purpose, the training phase is provided, in which further configurations can be created and in which the model is learned. The model serves to classify or differentiate between 2 classes, namely a first class with a normal reaction pattern of the pneumatic system and a second class with a deviating or abnormal reaction pattern. It should be noted that the detection algorithm typically offsets real-time signals or real-time data which occur during operation of the automation plant. Therefore, the detection algorithm relates typically to the respectively current state of the plant.

In a further, exemplary embodiment of the disclosure, the signals from at least two different digital sensors and the switching signal for the valve are read-in and thus represent points in time of two final position switches on a cylinder (clamping fixture) of the pneumatic system and the valve switching point in time. From the three digital signals, the four following time intervals are calculated:
- reaction time during extension of the cylinder (time interval from switching point in time/valve to departure from current final position);
- travel time during extension of the cylinder (time interval from departing one final position to reaching the other final position); and
- reaction time during retraction of the cylinder (time interval from switching point in time/valve to departure from current final position); travel time during retraction of the cylinder.

This aspect has the advantage that, on the basis of only three digital signals (or binary signals, on/off) four statements can be derived which have a significant influence upon error detection and optionally upon error localisation. Therefore, error detection can also be applied to existing systems which are not yet equipped with an extensive sensor system.

In one advantageous development of the disclosure, in addition to the minimum sensor system (with the three digital signals) which is sufficient to execute the detection algorithm and perform error localisation, an additional sensor can be formed in the valve which detects whether and when the valve has switched. This signal can be described as the valve switching point in time. This additional digital signal provides an additional time indication, from which more detailed information can be acquired. If, e.g., the time between "switch valve now" and "valve has switched" is constant but if it has also been detected that the reaction time has changed, this change is not due to the valve. Therefore, the localisation method will be indicative of another possible source of error or cause.

In a further exemplary embodiment of the disclosure, in addition to the minimal sensor system, a pressure sensor system can be formed on the two working connections of each valve. This pressure sensor system is embodied, e.g., in the applicant's Motion Terminal (designated as VTEM) and can be used accordingly in order to provide further information for calculating the anomaly score and for error localisation and thus to provide a more detailed localisation result. Therefore, in this exemplary embodiment of the disclosure a pressure signal is thus also taken into consideration as a signal for calculating the anomaly score and for error localisation.

In a further exemplary embodiment of the disclosure, in addition to the minimal sensor system, a pressure system and/or flow sensor system which can monitor a plurality of valve clusters in order likewise to provide further information for calculating the anomaly score and for error localisation and thus to provide a more detailed localisation result.

In a further exemplary embodiment of the disclosure, after calculating the reaction time and travel time during extension and retraction of the cylinder, the detection algorithm performs at least one of the following processing steps:

Feature Extraction; this step serves to reduce the data volume. Therefore, the method can be performed more quickly.

Z-score normalisation; this step is used for standardisation and relates to the transformation of a random variable. Therefore, the generalisation capability and comparability can be increased. The advantage resides in scaling of the physical sizes to normed sizes which are equilibrated;

Principal Component Analysis (PCA); this step serves to structure and simplify the extensive data sets detected by means of sensors, in that a multiplicity of statistical variables is approximated by a smaller number of the most meaningful linear combinations (principal components). The computing time can therefore be reduced.

Classification, in particular using K-means or comparable methods;

Logistical Function in which the result of K-means is mapped to values between '0' and '1' and therefore the anomaly score is normed to values in an interval [0, . . . , 1]; and/or Smoothing; impaired sensor data are smoothed only at the end of processing.

Therefore, sensitivity and specificity can be adjusted.

In a further exemplary embodiment of the disclosure, the detection algorithm outputs, as an intermediate result of the method, an anomaly score in the value range [0, . . . , 1] and a sensor relevance value. With this intermediate result, the machine localisation method can then be applied in a subsequent step.

In a further exemplary embodiment of the disclosure, the machine localisation method is based upon a decision tree, wherein the decision tree is calculated on the basis of the detected circuit diagram. The circuit diagram can be read-in from a file, e.g., Eplan, FluidDraw, or from an Automation ML file or files in similar formats (e.g., XML-based). Alternatively, other machine learning methods can be used. In particular, an artificial neural network which serves to localise the error can be learned in an upstream training phase.

In a further exemplary embodiment of the disclosure, the machine localisation method extracts, from the detected circuit diagram and from the read-in signals, data relations between the data sets, wherein the data relations serve to localise the error.

In one advantageous development of the method, the result of the machine localisation method comprises an error probability value for typically all components—or alternatively for components selected to be relevant—of the pneumatic plant and/or of sub-components within one component. Furthermore, in other developments the following processing steps can be performed:

aggregating all error probability values of all components;
accessing a memory, in which a system of rules is stored for localising the error in relation to individual components of the automation plant.

The machine localisation method comprises two stages for error localisation. A first stage calculates in which component of the automation plant the error is located. Therefore, error localisation is effected in the first stage at component level. The result can read, e.g., as follows: "clamping fixture X jammed" or "valve Y defective". A second stage calculates where precisely the error can be localised within the component. Therefore, error localisation is effected in the second stage at sub-component level. The result can read, e.g., as follows: "Friction on cylinder", "Leakage at cylinder chamber A", "Hose B has a leakage", "Restrictor D has become clogged", etc.

Therefore, in the machine localisation method, firstly the probability is determined for typically all components (clamping fixture components). In one advantageous, alternative exemplary embodiment of the disclosure, the probability is determined only for components determined to be relevant (e.g., in a configuration phase) in order to reduce the computing resources and to be able to provide the result possibly more quickly. Subsequently, it is derived from this whether the error occurs in the identified clamping fixture or whether all clamping fixtures of a valve are affected. If the latter is the case, by accessing the system of rules a conclusion is drawn that there is a problem on the valve. If all valves of a valve cluster have an anomaly, the system or rules indicates that the problem is at the valve cluster level. Therefore, by accessing the system of rules, error localisation can be always be restricted in an ever finer-granular manner to specific components of the plant.

The object is further achieved by a computer program, comprising computer program code, for performing all of the method steps of the method described in more detail above when the computer program is executed on a computer. In this connection, it is also possible for the computer program to be stored on a computer-readable medium.

The object is further achieved by a computer program product, comprising computer program code, for performing all of the method steps of the method described in more detail above when the computer program is executed on a computer. The computer program product can be designed, e.g., as a stored, executable file, optionally comprising further components (such as libraries, drivers etc.) or as an electronic unit (microprocessor, computer) comprising the already installed computer program.

The terms used in this application are explained in greater detail hereinafter.

The machine localisation method is an exclusively computer-implemented method. The machine localisation method is used for predicting errors which occur in specific components of the plant. To this end, a decision tree can be constructed, in which a model is represented. The model can be stored in a memory. The decision tree is used for the operating time in order to allocate objects (in this case: the individual components of the plant, such as the valve, a valve group, the compressed air supply, the electrical supply etc.) to error classes. In so doing, probabilities can be assigned.

For example, a Bayesian network or other decision logic can be applied. Basically, from observing the three digital signals of the pneumatic system relating to the operating time, it is possible to indicate the probability of component-based and sub-component-based sources of error. If a common probability distribution of a larger number of variables is to be managed, then for an explicit representation by indicating a probability for each status combination, resource limits (waiting time, processor capacity etc.) are quickly encountered. For example, in the case of 20 binary variables, i.e., 20 variables each with two statuses, 220=1048576 individual values must already be specified. By utilising (conditional) dependencies between variables of the domain to be modelled, the required number of values to be indicated can often be reduced to a manageable size. Bayesian networks represent such an approach. A Bayesian network of random variables consists of two parts:

- a directed acyclic graph, of which the nodes correspond to the random variables and with the edges of which the conditional dependencies between the variables are coded;
- probabilities determined by tables associated with the variables.

The decision tree is constructed in a training or learning phase and then in use is worked through in a top-down manner for prediction or error localisation purposes. Neural networks or naive Bayes classifiers, k-nearest neighbour methods or support vector machines can be used as an alternative technique for the machine localisation method.

The detection algorithm is a computer-implemented method for grouping or classifying data sets which represent pneumatic system statuses (normal/abnormal) on the basis of the detected signal combinations. To this end, e.g., a k-means algorithm can be applied. The aim of the k-means algorithm is to divide the data set into k (in particular here 2) partitions such that the sum of the squared deviations from the cluster centroids is minimal. In extended exemplary embodiments of the disclosure, the k-median algorithm or the k-means++ algorithm or comparable classification algorithms can also be applied.

The read-in interface is a digital interface. It serves to read-in digital data and can be operated in particular in accordance with an OPC Unified Architecture (OPC-UA) protocol. The OPC-UA is an industrial machine-to-machine communications protocol to ensure interoperability. Data from field buses, e.g., Profinet, can likewise be read-in.

The signals are digital signals (on/off) which can be further processed in digital form directly by the processor units. Digital sensors are typically directly used. In the case of a digital sensor, the electrical signal is converted directly in a digital manner (A/D conversion internal to the sensor). The subsequent calculations (e.g., error compensation) can take place in a microprocessor. Alternatively, analogue sensors can also be provided, of which the signal is transformed into a digital signal in an external or separate A/D converter. The digital signal is then available as a numerical value and can be output via any digital protocol, such as USB, CAN-open, or Profibus. During further transmission, the digital pressure signal is immune to disruptive influences which could cause a deterioration in precision.

An error detection module is an electronic module which can be distributed to a plurality of component parts and is designed with the functionality of error avoidance and error localisation for components of a pneumatic plant. In particular, the error detection module which can be implemented locally on devices of the automation plant can access centrally executed and in particular cloud-based calculations. The error detection module is arranged to implement control measures and/or diagnosis measures if a possible failure of a component of the automation plant is recognised in good time by the maintenance software. Defective component parts which possibly soon result in the plant experiencing a stoppage are thus identified independently of the typical maintenance times and can be replaced before damage actually occurs. This allows cost savings to be achieved with respect to routine or time-dependent preventative maintenance because work can be carried out only when it is actually necessary. Within the scope of the disclosure, it is typical that the analysis is carried out in parallel with the operation of the plant in order to avoid stoppage periods.

The gateway (node) is a computer-based unit, can be designed as an edge computer close to the field and has a cloud-based interface (web interface) to the server. The gateway calculates the anomaly score and processes it further as part of error localisation. The result can be relayed to a server and/or at field level (e.g., PLC).

A component is a field device and thus a technical apparatus in the field of automation technology which is directly related to a production process. In automation technology, the term "field" designates the area outside control cabinets or control rooms. Therefore, field devices can be both actuators (control elements, valves etc.) and sensors (measuring transducers) in factory and process automation. The components are connected to a control and management system, mostly via a field bus. The components can be designed having sensors in order to detect, generate or aggregate the sensor data so that the data can be used in an evaluated manner for regulation, control and further processing. The components are part of an automation plant which can comprise devices (e.g. industrial robots).

The control device is an electronic module which is used for controlling (open loop control) and/or regulating (closed loop control) a machine or automation plant having a group of field devices and is programmed on a digital basis. In particular, they can be a programmable logic controller (PLC). In the simplest case, a control device has inputs, outputs, an operating system (firmware) and an interface, via which the user program can be loaded. The user program determines how the outputs can be switched in dependence upon the inputs. The operating system ensures that the current status of the transmitters is always available to the user program. On the basis of this information, the user program can switch the outputs such that the machine or the automation plant functions in the desired manner. The control device is connected to the automation plant with its field devices by means of sensors and actuators.

BRIEF DESCRIPTION OF THE DRAWINGS

The disclosure will now be described with reference to the drawings wherein.

DESCRIPTION OF EXEMPLARY EMBODIMENTS

Figure 1:
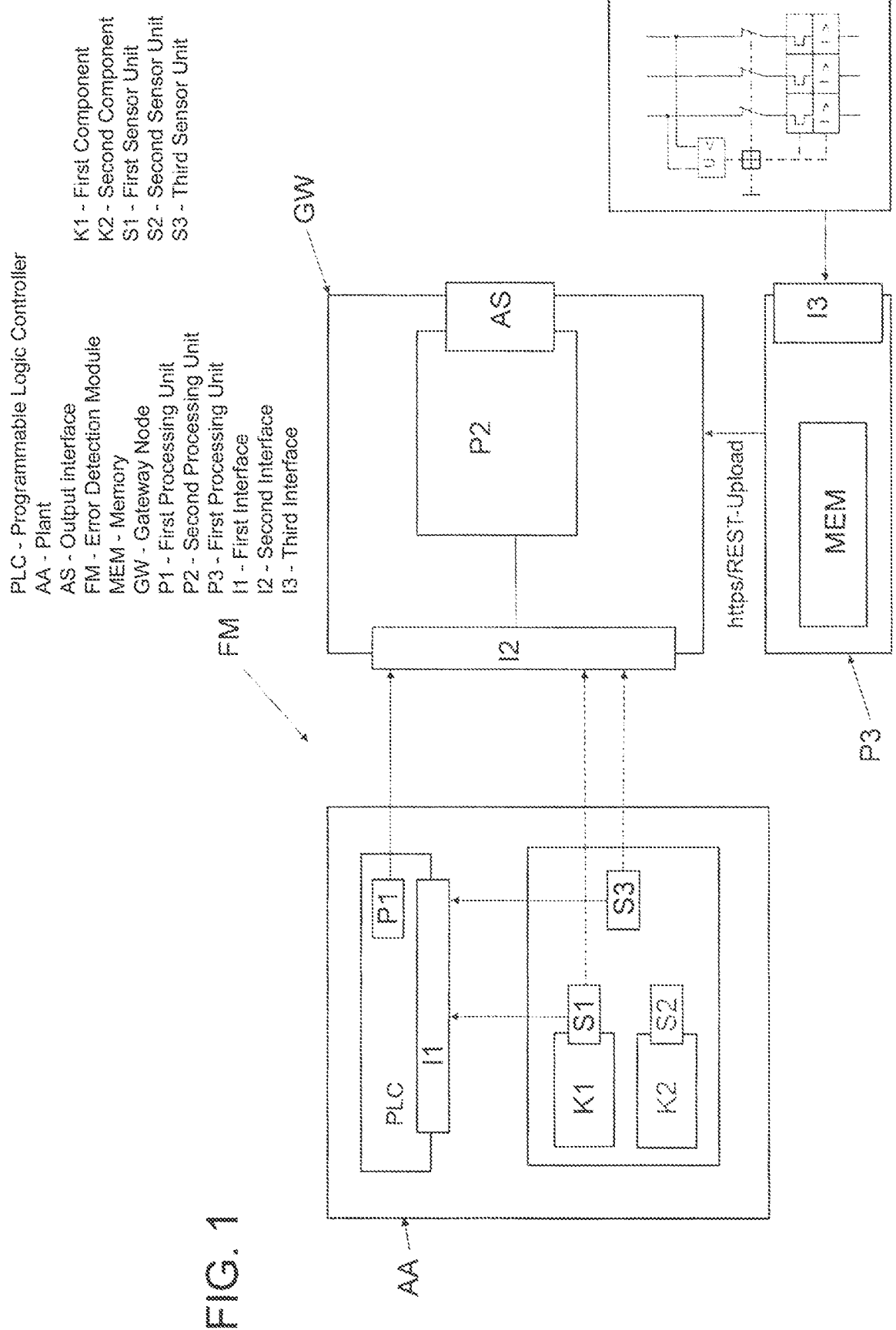
FIG. 1 shows an overview of the inventive error detection system comprising an error detection module.

In the following detailed description of the figures, exemplary embodiments, which are to be understood to be non-limiting, together with the features and further advantages thereof will be discussed with the aid of the drawing.

The disclosure serves to technically monitor a pneumatic system as an example of an automation system or plant comprising various field devices (hereinafter also referred to as components) which are controlled via a control device (e.g., PLC). In particular, errors are to be recognised in good time and typically at a point in time before the respective component fails or causes an error in the plant. To this end, an error detection module, explained in greater detail hereinafter in relation to FIG. 1, is to be used.

The disclosure has the advantage that early error detection for complex, multiple-component—typically pneumatic—automation plants becomes possible although only very little measurement data are available and which can be operated quasi with a minimal sensor system. In particular, it is possible to provide a result with error localisation although only two digital sensors and one switching command are used, in particular for detecting the points in time of two final position sensors on one cylinder and one sensor for detecting the valve switching point in time. This has the advantage that anomaly detection also becomes possible in such plants, in which only the actuator is equipped with a sensor system (e.g., final position sensors). The method presented here was based upon a model, in which at least these signals are taken into consideration. Optionally, still further signals, such as pressure signals and/or flow signals or other signals of sensors internal to the valve are taken into consideration which are detected in the pressure supply and/or in the valve. With the aid of the detection algorithm, deviations or changes from the correct or typical reaction behaviour of the pneumatic plant are now detected automatically and in real time, such as e.g. the time between "valve switching" and "leaving final position 1" and travel time (final position 1 to final position 2). Moreover, in principle the time between sending the control command to the physical switching of the valve is measured and learned. In one advantageous development, an additional valve-internal sensor can be formed which detects if the valve has switched. The same applies for the return movement of the valve. The measurement variables and the patterns resulting therefrom are learned during the "good" operation (i.e., during error-free operation). Error images show characteristic patterns which are used in accordance with the disclosure for anomaly detection and for error localisation. Moreover, the circuit diagram of the pneumatic system is available in a digital pneumatic circuit diagram which is read-in, e.g., from a Fluid Draw or Eplan or Automation ML file, and is used for constructing decision logic. If, by means of the detection algorithm, a deviation from the GOOD pattern is detected, error localisation can be provided in a second step by applying a machine localisation method. To this end, a logic circuit comprising implemented decision logic can be used, e.g., using a decision tree or Bayesian networks or other machine learning methods.

The background of the solution proposed in this case is that the time behaviour of a tensioning or clamping system (e.g., automobile manufacture, vehicle body manufacture)—consisting of a valve, hose system and clamping fixtures—changes as wear increases. A test arrangement is created in order to identify whether and how manipulations performed on the pneumatic system affect the time behaviour. Variations and manipulations have been performed on the pneumatic system in a targeted manner. This comprises friction and leakage at the clamping fixture and at the valve and changes in the length of the lever arm, the hose length between the valve and clamping fixture and a variation in the supply pressure. The closing time and the delay time have been recorded as the cylinder is opening and closing. As a result of the tests conducted by the applicant, it can be stated that a change in friction, leakage and supply pressure of the clamping fixture affect the delay and closing times which can be derived from the final position switch signals. The results from the test arrangement influence the configuration of the error localisation model, in which in a first stage the error is localised in relation to individual components of the plant and in a second stage the error is localised in relation to individual sub-components of the component. It is possible to unequivocally identify which type of malfunction is present. Therefore, it is possible to contain and in particular localise the error on the basis of the (three) digital signals.

FIG. 1 schematically illustrates the error detection module FM. It comprises on the side of the automation plant AA the—typically pneumatic—components K, e.g., valve clusters or valve disks, wherein a valve cluster comprises, in turn, a plurality of valves having clamping fixture/cylinder units and/or further pneumatic actuators (e.g., pneumatic drives etc.) and sensors as well as a pressure supply. Furthermore, a controller is provided which can be designed as a programmable logic controller which can also be designated as PLC. The components K are designed having sensors S which serve to detect digital signals or switching commands to a valve. A first component K1 comprises at least one sensor unit S1 for detecting three digital signals, a second component K2 comprises, in turn, a sensor unit S2 for detecting at least three signals etc.

As shown in FIG. 1, further sensors S3 can also send signals (e.g., pressure signals) to the PLC. The controller PLC receives the digital signals via a read-in interface I1 and furthermore is designed having a first processor unit P1 which serves to execute a detection algorithm on the basis of the detected or read-in signals. The detection algorithm serves to calculate an anomaly score for the automation plant AA on the basis of the set of detected or read-in signals. The calculated anomaly scores can be transferred to an IoT gateway GW via a data interface (e.g., OPC-UA). The calculated anomaly scores and/or the detected signals are communicated via a second interface I2 to a second processor unit P2 which—if the anomaly score calculated with the first processor unit indicates an anomaly—can be designed to perform a machine localisation method S34 (which is described in greater detail below with reference to FIG. 5) to localise the error in order, with respect to the anomaly score, to calculate and provide as a result probabilities of possible causes of error in relation to individual components K of the automation plant AA.

In the example illustrated in FIG. 1, the first processor unit P1 is implemented on a different device than the second processor unit P2. The first processor unit P1 can be formed on the control unit PLC and the second processor unit P2 can be formed, e.g., on a gateway node GW (or gateway for short). In order to perform the machine localisation method, the second processor unit P2 accesses a memory MEM, in which a trained model is stored. The second processor unit P2 receives a circuit diagram of the pneumatic plant AA via a circuit diagram read-in interface 13. The circuit diagram is provided in digital form and contains information relating to the structure of the plant AA and relating to the functionality (in particular switching points in time of the valves etc.).

In the exemplary embodiment shown in FIG. 1, a separate gateway GW is provided which serves as an intermediary between, on the one hand, the plant AA with the components K and with the programmable logic controller PLC and, on the other hand, the server SV. The gateway GW can be implemented, e.g., in a superordinate management system of the plant AA and/or can be allocated to the plant AA (e.g. in the same security domain as the plant). A third processor unit P3 can be formed on the server SV in order to be able to perform e.g. the machine localisation method on a cloud-based server.

As schematically indicated in FIG. 1, it is fundamentally possible for the first processor unit P1 to send the locally calculated anomaly scores quasi as an intermediate result to the second processor unit P2 (solid arrow). Alternatively or cumulatively, the detected signals can also be communicated to the second processor unit P2. This can be effected either directly from the sensor S and/or from the component K (both are illustrated in FIG. 1 by a dashed line) and/or from the controller PLC.

Figure 2:
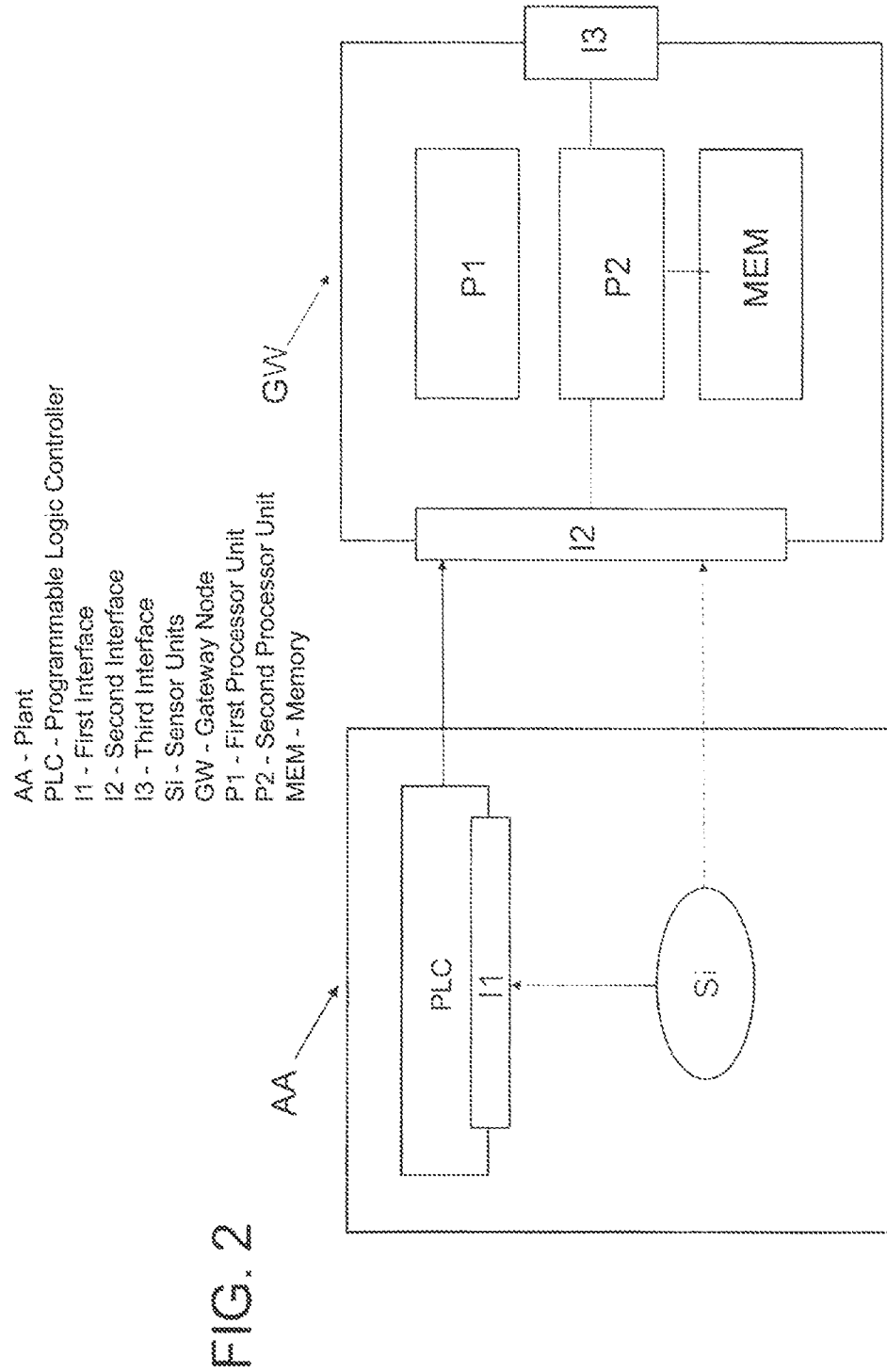
FIG. 2 shows an exemplary embodiment of an error detection module which is an alternative to the illustration in FIG. 1.

FIG. 2 shows an alternative exemplary embodiment, in which the gateway GW comprises both the second and the first processor units P2, P1. The components K1, K2 send their three digital signals to the PLC which has then sent the signals via the network connection (second interface I2) to the second processor unit P2. Alternatively, the components can send the locally detected signals directly to the second processor unit P2 (without the bypass via the PLC). It is even feasible that the sensor units Si themselves can be designed having a further network interface in order to communicate the data.

Figure 3:
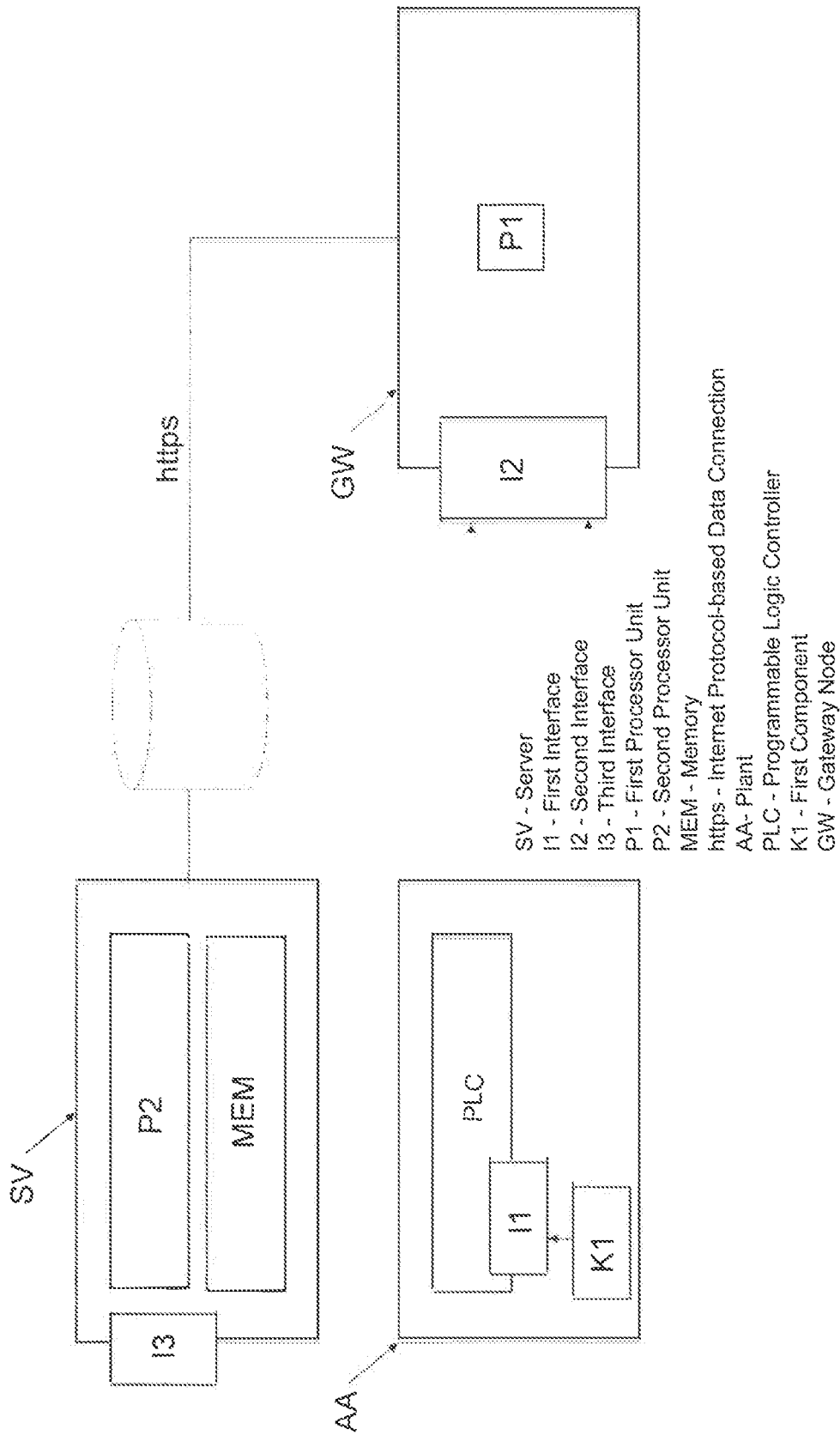
FIG. 3 shows a further schematic view of an error detection module comprising a cloud-based server and further component parts.

FIG. 3 shows an exemplary embodiment using a cloud-based server SV. The sensor data are then detected on the components K of the pneumatic plant AA. The first processor unit P1 can now be formed either locally in the controller PLC or on one of the IoT gateway nodes GW which is allocated to the plant and can be designed as an edge computer. The gateway GW exchanges data via an Internet protocol-based data connection (e.g., https etc.) with the server SV, on which the second processor unit P2 is formed which is designed to perform the machine localisation method. The learned model can be held in the memory MEM of the server SV. Therefore, it becomes possible to use the higher computing resources (and memory resources) of the server for localising the error and for calculating the result.

As the above examples are intended to show, the functionality of the error detection module FM can also be effected in a distributed manner with the following two aspects: detection algorithm and machine localisation method S34.

In other words, the first processor unit P1 and the second processor unit P2 can be implemented on different computer-based entities. It is also possible to design a further processor unit which serves to configure the model or to train the localisation method on the basis of training data. The training data can comprise patterns of signal combinations in GOOD cases (error-free operation of the plant).

Figure 4:
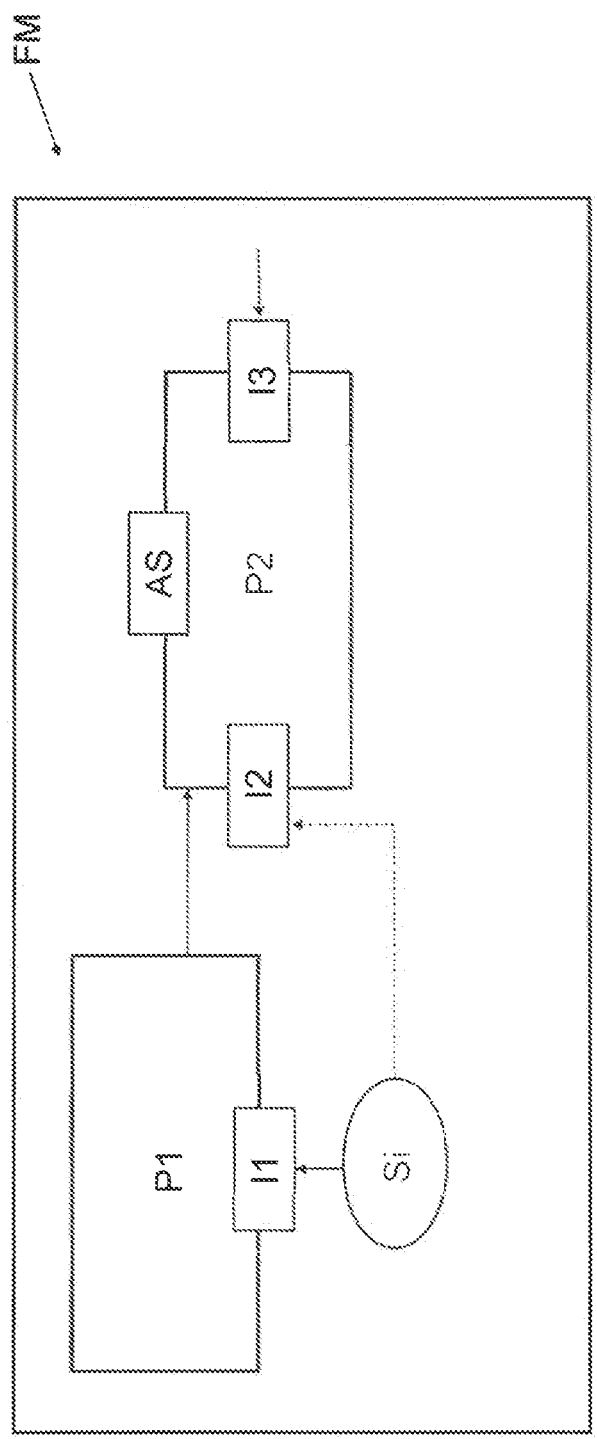
FIG. 4 shows an alternative, schematically illustrated design of the error detection module.

As illustrated in FIG. 4, it is typical that the detection algorithm is executed as locally as possible, in the proximity of the generated data, typically in the PLC and the machine localisation method S34 can be performed on an entity which provides sufficient resources, typically performed on the server SV. Only one client for model checking for the machine localisation method S34 can then be installed on the gateway GW and so the computationally intensive processes can be performed on the server SV and only the result is output to configurable entities, in particular to the gateway GW and optionally to the components K1, K2 of the plant AA and/or to the PLC. The outputting can be effected via an output interface AS.

Figure 5:
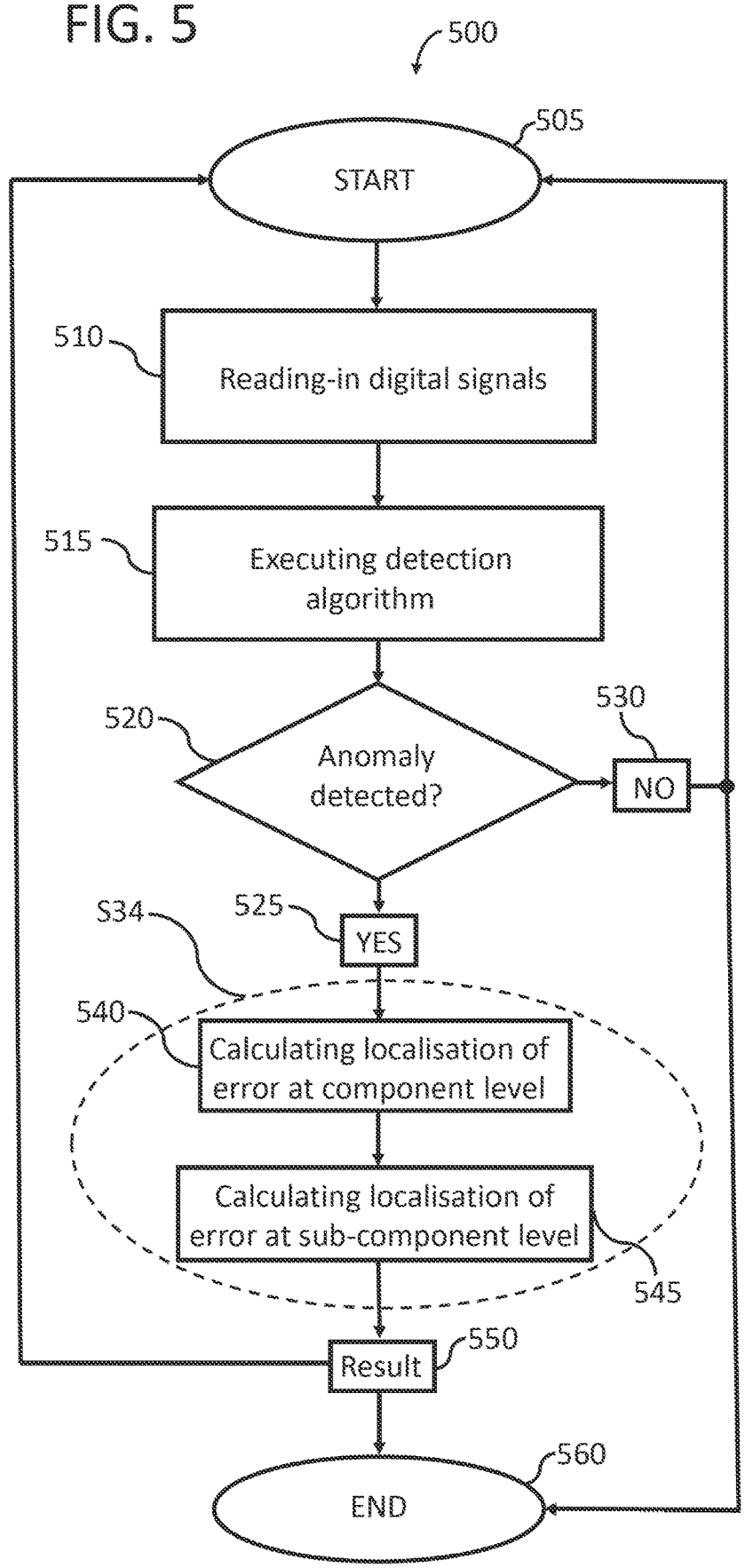
FIG. 5 shows a flow diagram of method steps of an error detection method according to an exemplary embodiment of the disclosure.

FIG. 5 shows a flow diagram of an error detection method 500. After the start at step 505, the digital signals are read-in in step 510. In step 515, the detection algorithm is executed on the or with the read-in signals. It calculates an anomaly score and a sensor relevant value as an intermediate result. The intermediate result thus represents whether an anomaly is present 525 in the plant AA or not 530, which is detected in step 520. Depending upon the result, the method branches to different calculation cases, as can be seen in FIG. 5. If there is no anomaly present, the plant appears to function "as always"—i.e., in an error-free manner. The method can be ended at step 560 with an EXIT or restarted at step 505. Otherwise (when an anomaly or deviation is detected at step 525), a machine localisation method S34 is performed which has been trained in a training phase in order to calculate probabilities of possible causes of error (the result at step 550) on the basis of a digitally or manually detected circuit diagram of the automation plant AA with respect to the respectively calculated anomaly score. The machine localisation method S34 can comprise two stages. In the first calculation at step 540, localisation of the error is calculated at component level (e.g., error in clamping fixture X or valve Y) and in the second calculation at step 545, localisation of the error is calculated at sub-component level. In the second step calculation at step 545, it is analysed where the error within the component identified as defective can be localised. The machine localisation method S34 can be implemented as an algorithm which is executed taking into consideration the information of the detected circuit diagram (design, architecture and structure of the circuit and switching points in time). As shown above, the functionality of the algorithm can also be implemented on other devices or servers SV.

Figure 6:
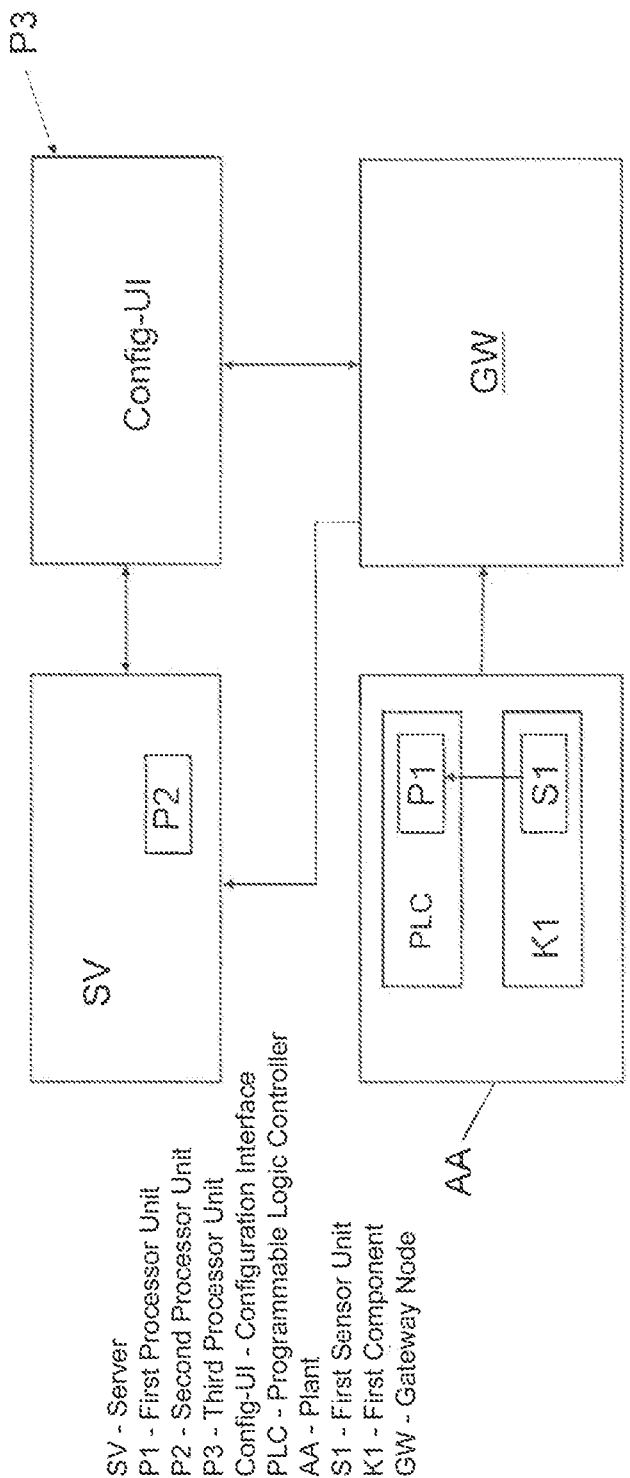
FIG. 6 shows a schematic illustration of an error detection system comprising further component parts according to an exemplary embodiment of the disclosure.

FIG. 6 is a further structural architectural image of an error detection system comprising a first processor unit P1 which in this case is implemented on the PLC, and comprising the second processor unit P2 which is implemented on the server SV which exchanges data with the gateway GW via a data connection. In addition, a configuration interface Config-UI can be provided, by means of which the machine localisation method S34 algorithms and/or calculations at step 540 and 545 can be configured. The configuration interface Config-UI is typically cloud-based or can also be provided locally as a computer program. The configuration interface Config-UI can comprise user interface elements, such as dashboards. In this case, a version of the learned model (e.g., constructed decision tree) can also be installed having a training master as an application for configuring the learning phase for the model or for generating the decision tree and having a scoring master as an application for calculating the anomaly score according to a further option. A suite of applications for error detection and localisation can be installed on the server SV (e.g., industry PC). In particular, a runtime environment (e.g., Java Runtime environment) of the trained model is implemented which is synchronised with the configuration interface Config-UI and interacts with the gateway GW typically via Internet Protocol-based Data Connection https/REST-Upload requests. The read-in signals are then sent via the gateway GW to the server SV for the purpose of error detection and localisation.

In one exemplary embodiment, a further processor unit which in FIG. 6 is defined as the third processor unit P3 can be provided and serves to generate the model for the machine localisation method S34. The user has the option of adjusting settings via the configuration interface Config-UI. The functionality for generating the model can also be implemented on the server SV.

In this exemplary embodiment, the IoT gateway node GW can be designed having a client for the machine localisation method. The client/gateway can be positioned in the field in the vicinity of the plant. The gateway GW can have a browsing functionality which can be used for paging through and inspecting the anomaly scores communicated by the controller PLC. Furthermore, the gateway node GW can have a proxy for the algorithm provided thereon which can be operated in the cloud (e.g. on the server SV) and a proxy for an automation suite with further applications and programs as a PC application. The functionality of the automation suite is the same as the functionality of the cloud. Furthermore, the gateway GW can have a circular buffer for intermediate storage of the data formed thereon, as well as a lite-version of the trained model (for performing the machine localisation method) for the purposes of persistence, configuration, license management and further functionalities in conjunction with the machine localisation method. Fundamentally, depending upon the configuration the gateway GW can have still further programs installed thereon which, inter alia, can also run in the background and can provide specific services. User interactions take place typically only indirectly, e.g. via signals, pipes and above all (network) sockets.

In one test, 6 pneumatic clamping fixtures were operated continuously for a runtime extended in comparison with normal operation, or for cycle time reduced in comparison with normal operation, over a long period of time until wear occurs. Indicators of wear could be seen in the data in all clamping fixtures 2 weeks prior to failure. Failures and induced error cases can be detected in accordance with the disclosure by means of the machine localisation method or trained model and automated process monitoring is possible.

Finally, it is noted that the description of the disclosure and the exemplary embodiments are fundamentally to be understood to be non-limiting with respect to a specific physical implementation of the disclosure. All features explained and illustrated in conjunction with individual embodiments of the disclosure can be provided in a different combination in the subject matter in accordance with the disclosure in order to achieve the advantageous effects thereof at the same time.

The scope of protection of the present disclosure is set by the following claims and is not limited by the features explained in the description or shown in the figures.

For a person skilled in the art, it is in particular obvious that the disclosure can be used not just for pneumatic plants but also for other hydraulic plants or other fluid-technology systems or electrical spindles. Furthermore, the component parts of the error detection module can be distributed over a plurality of physical products.

LIST OF REFERENCE NUMERALS

FM Error Detection Module
GW Gateway Node
AA Plant
PLC Programmable Logic Controller
P1 First Processor Unit
P2 Second Processor Unit
P3 Third Processor Unit
I1 First Interface
I2 Second Interface
I3 Third Interface
S1 First Sensor Unit
S2 Second Sensor Unit
S3 Third Sensor Unit
K1 First Component
K2 Second Component
AS Output Interface
MEM Memory
SV Server
https Internet Protocol-based Data Connection
Si Sensor Units
S34 Machine Localisation Method
Config-UI Configuration Interface
500 Flow Diagram of an Error Detection Method
505 Start (or Restart)
510 Step One
515 Step Two
520 Intermediate Result Detection Step
525 Anomaly Present
530 Anomaly Not Present
540 First Stage
545 Second Stage
550 Result
560 End

What is claimed is:

1. An error detection module for detecting and evaluating anomalies in an automation plant, the error detection module comprising:
   a read-in interface for reading-in a set of digital signals from the automation plant in real time;
   a first processor unit which is designed to execute a detection algorithm for calculating an anomaly score for the automation plant on the basis of the set of digital signals; and
   a second processor unit which is designed—in the event that the anomaly score calculated with the first processor unit indicates an anomaly—to perform a machine localisation method for localising an error, wherein the machine localisation method has been trained in a training phase in order to calculate and provide as a result, on the basis of a detected circuit diagram of the automation plant with respect to the calculated anomaly score, probabilities of possible causes of the error in relation to individual components of the automation plant,
   wherein the set of digital signals comes from at least two different digital sensors and a switching command and represents points in time of two final position switches on a cylinder of the automation plant and a valve switching point in time, and
   wherein four time intervals are calculated from the set of digital signals, the four time intervals including (1) a reaction time during an extension of the cylinder, (2) a travel time during the extension of the cylinder, (3) a reaction time during a retraction of the cylinder, and (4) a travel time during the retraction of the cylinder.

2. The error detection module as claimed in claim 1, wherein the first processor unit is implemented on a different device than the second processor unit.

3. The error detection module as claimed in claim 2, wherein the first processor unit is implemented on a control unit.

4. The error detection module as claimed in claim 1, wherein the second processor unit or a further processor unit which is designed to generate a model comprises a circuit diagram read-in interface for reading-in a circuit diagram for the automation plant in a digital form.

5. The error detection module as claimed in claim 1, further comprising a configuration interface as a front-end for configuring and/or training a model.

6. The error detection module as claimed in claim 1, wherein the automation plant comprises a pneumatic system having a pneumatic drive, wherein a plurality of drives and/or actuators are connected to a valve and a plurality of valves are arranged on a valve cluster and a plurality of valve clusters are connected to a supply unit.

7. An error detection system for detecting and evaluating anomalies in automation plants comprising:
   an error detection module as claimed in claim 1;
   a gateway; and
   a cloud-based server which is connected to the error detection module via a web interface.

8. The error detection module as claimed in claim 1, wherein the automation plant is a pneumatic automation plant.

9. A method for detecting and evaluating anomalies in an automation plant, the method comprising:
   reading-in a set of at least three digital signals of the automation plant in real time via a read-in interface, wherein the set of at least three digital signals comes from at least two different digital sensors and at least one switching command and represents points in time of at least two final position switches on a cylinder of the automation plant and at least one valve switching point in time;
   executing a detection algorithm for calculating an anomaly score for the automation plant on the basis of the set of the at least three read-in digital signals, wherein the detection algorithm for calculating the anomaly score includes at least the steps of calculating four time intervals from the set of at least three digital signals, the four time intervals including: a reaction time during an extension of the cylinder; a travel time during the extension of the cylinder; a reaction time during a retraction of the cylinder; and a travel time during the retraction of the cylinder; and
   in the event that the calculated anomaly score indicates an anomaly:
      triggering a machine localisation method for localising an error, wherein the machine localisation method has been trained in a training phase in order to calculate and as a result provide, on the basis of a detected circuit diagram of the automation plant with respect to the calculated anomaly score, probabilities of possible causes of error in relation to individual components of the automation plant.

10. The method as claimed in claim 9, wherein the detection algorithm for calculating the anomaly score is a pattern recognition algorithm or is effected by accessing a memory, in which a trained detection model is stored.

11. The method as claimed in claim 9, wherein the machine localisation method calculates probabilities of possible causes of error in relation to individual sub-components of a component.

12. The method as claimed in claim 9, wherein the read-in signals of the two final position switches comprise a valve switching point in time signal and/or a pressure signal and/or a flow signal.

13. The method as claimed in claim 9, wherein, after calculating the reaction times and travel times during extension and retraction of the cylinder, the detection algorithm performs the processing steps of:
   feature extraction;
   Z-score normalisation;
   principal component analysis;
   classification;
   logistical function; and/or
   smoothing.

14. The method as claimed in claim 13, wherein a K-means and/or a K-median algorithm are/is used in the classification processing step.

15. The method as claimed in claim 9, wherein the detection algorithm comprises as a result an anomaly score and a sensor relevance value.

16. The method as claimed in claim 9, wherein the machine localisation method comprises a decision tree method in which a decision tree is calculated on the basis of the detected circuit diagram, or comprises a Bayesian network method.

17. The method as claimed in claim 9, wherein the machine localisation method extracts, from the detected circuit diagram, data relations between data sets which are based upon read-in signals.

18. The method as claimed in claim 9, wherein the result of the machine localisation method comprises an error probability value for all components and/or all sub-components of the components and wherein the method further performs the processing steps of:
   aggregating all error probability values; and
   accessing a memory, in which a system of rules is stored for localising the error in relation to individual components and/or sub-components of the automation plant.

19. A non-transitory computer-readable medium stored thereon a program with computer program code for carrying out all method steps of the method as claimed in claim 9 when the computer program is executed on a computer.

20. The method as claimed in claim 9, wherein the automation plant is a pneumatic automation plant.

* * * * *